July 25, 1961 S. ÅKE GÖSTA SVENSSON 2,993,494
APPARATUS FOR CLEANING MACHINE PARTS AND THE LIKE
Filed Jan. 7, 1959 2 Sheets-Sheet 1
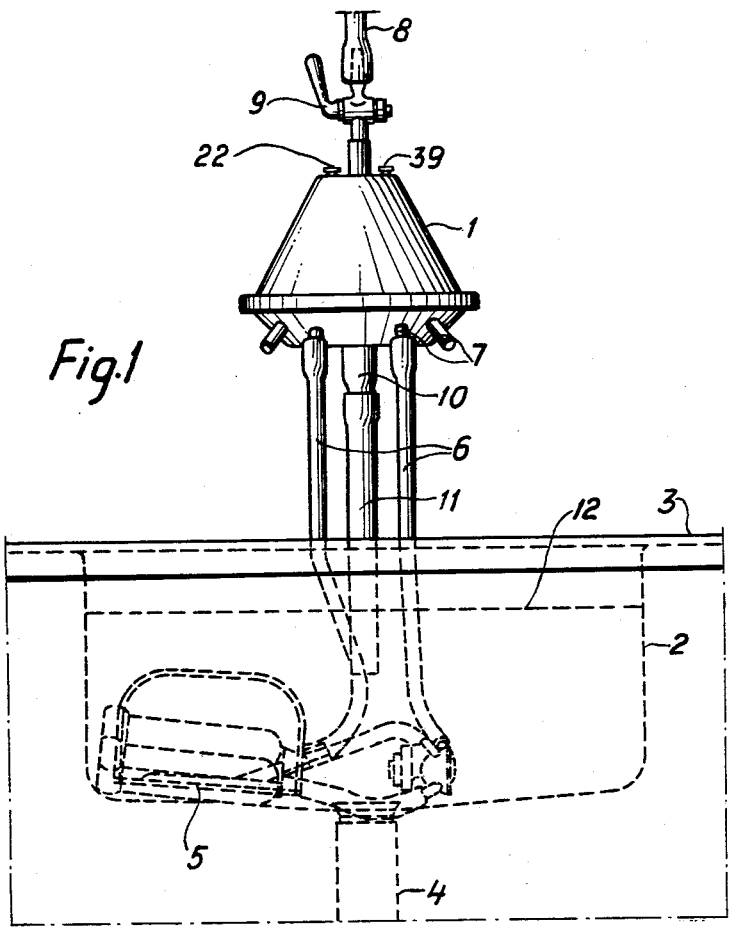
INVENTOR
Stig Åke Gösta Svensson
BY
Davis, Hoxie, Faithfull & Hapgood
ATTORNEYS

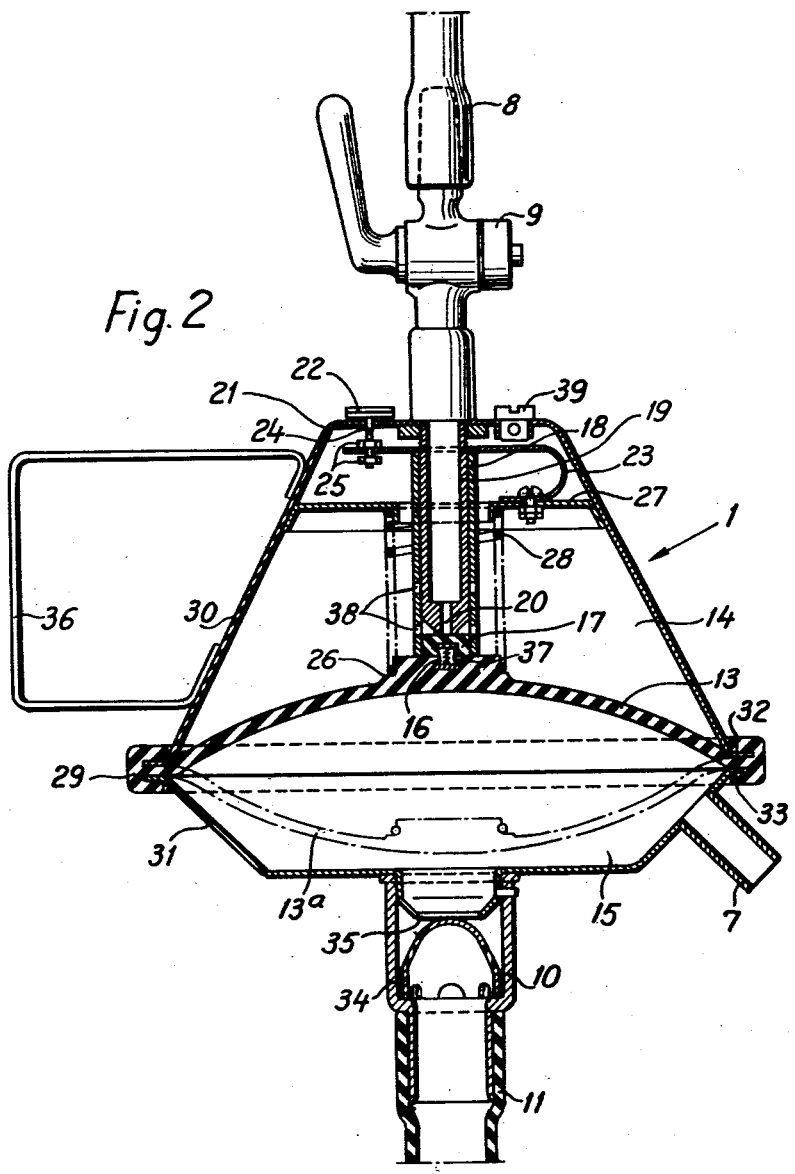

United States Patent Office 2,993,494
Patented July 25, 1961

2,993,494
APPARATUS FOR CLEANING MACHINE PARTS AND THE LIKE
Stig Åke Gösta Svensson, Sodertalje, Sweden, assignor to Aktiebolaget Separator, Stockholm, Sweden, a corporation of Sweden
Filed Jan. 7, 1959, Ser. No. 785,350
7 Claims. (Cl. 134—169)

This invention relates to apparatus for cleaning machine parts of the type having throughflow channels, and more particularly to an improved apparatus for this purpose.

For cleaning milking machine parts having throughflow channels, it is customary to use an apparatus comprising two containers, namely, an upper container in which there is alternately vacuum and atmospheric pressure during the cleaning, and a lower, open container. Submerged into the latter container, which contains cleaning liquid, are the parts to be cleaned except the free ends of the long milk tubes associated with the parts, these free ends being attached to tube nipples arranged on the upper container, whereby the upper and the lower containers communicate with each other through the channels situated in the parts. Through the pressure variations in the upper container, the cleaning liquid in the lower container is caused to flow forwards and backwards through the channels in the parts to be cleaned. The pressure variations in the upper container are obtained by means of a valve device. For adjusting the valves included in this valve device, a float is generally provided which is lifted by the cleaning liquid, which enters the upper container, the float then sinking again when the cleaning liquid flows back to the lower container. The cleaning liquid contains detergent. The forward and backward flow of this liquid therefore causes strong foam-formation, and the foam gradually fills the upper container. The strong foam-formation in this container affects the movements of the float. The operation of the apparatus thus becomes erratic because of impairment of the accuracy with which the float moves the valves to their opening and closing positions. Also, there is the inconvenience that foam enters the vacuum line and thereby impairs the operation of the vacuum pump. The float-guided regulating device, moreover, has the disadvantage that the cleaning cannot take place with sufficiently frequent pulsations, because while the upper container is being emptied, the cleaning liquid in it is acted upon only by the atmospheric pressure, as it discharges by gravity.

The present invention has for its principal object the provision of an apparatus which overcomes the above-noted problems in cleaning parts having throughgoing channels, especially the parts of milking machines, such as teat-cups, milk-claws with appurtenant tubes, machine covers, etc.

An apparatus made according to the invention comprises a container in which vacuum and atmospheric or superatmospheric pressure are alternately created during the cleaning and which is to be connected, by means of the parts to be cleaned, with an open container containing cleaning liquid in order that a forward and backward flow of the cleaning liquid through the parts may be obtained. By the apparatus of this invention, the above-mentioned inconveniences are substantially overcome in that the first-mentioned container is divided by a membrane into two separate chambers, one of which, through the movements of the membrane between two extreme positions, is alternately connected by means of a valve device to a vacuum source and to the atmosphere or a superatmospheric pressure source, while the other chamber is connected to the open container. Thus, in the operation of the apparatus, the cleaning liquid which is lifted from the open container into the last-mentioned chamber, and the foam that may be formed, will never come into touch with the valve device and cannot enter the vacuum line and the vacuum pump connected therewith.

The invention is described more in detail below, reference being made to the accompanying drawings, in which FIG. 1 is a side elevational view of a preferred form of the new apparatus, and FIG. 2 is a vertical sectional view of one of the containers shown in FIG. 1, namely, the container which is alternately under vacuum and atmospheric pressure or superatmospheric pressure.

In FIG. 1, the closed container is shown at 1 and the open container at 2. The latter may consist of a common sink which is built into a sinkstand 3 and is provided with a closable bottom outlet 4. The parts 5 and which are to be cleaned are shown as teatcups, milk-claws and appurtenant tubes, machine covers, etc., of a milking machine; and these parts are placed in the container 2. The free ends of the long milk tubes 6, which extend from the milk-claw pipes or the machine cover, are connected to tubes nipples 7 extending from the lower part of the container 1. There may be a plurality of such tube nipples 7, and those which are not used for the moment are kept closed by means of caps, plugs or the like of suitable material, for instance rubber. The container 1 is arranged above the container 2 and is connected to a vacuum line 8 which is closable by means of a cock 9, the line 8 being connected to a vacuum source, such as a vacuum pump (not shown). Container 1 has a bottom outlet 10 which, through a return line formed by a tube 11, opens into the lower container 2 below the surface 12 of the liquid contained therein.

As appears more in detail from FIG. 2, the container 1 is divided by a membrane 13 into two separate chambers 14 and 15. The upper chamber 14, through the movements of the membrane 13 between two extreme positions, is connected alternately, by means of a valve device, with the vacuum line 8 and the atmospheric air. The bottom outlet 10 extends from the lower chamber 15. By means of a flexible thread member 16 of nylon or other suitable material, the membrane 13 is connected with a valve 17 of the valve device, the valve 17 being secured in a pipe 18. This pipe is movably arranged on an inner concentric pipe 19 which is connected to vacuum line 8 through a socket and the cock 9. The pipe 18 projects into the chamber 14 and forms at its lower end a nozzle opening 20 with which the valve 17 cooperates when it is in its upper position shown in FIG. 2. In the wall of the container 1 is an opening 21 which is closable by means of a valve 22. The latter may be provided with a packing and is supported by a leaf spring 23 tending to move the valve 22 to the position closing the valve opening 21. The pipe or sleeve 18 is of such a length that when the valve 17 is in its upper position, the spring 23 is raised by sleeve 18 and thus keeps valve 22 raised so that the opening 21 is uncovered. The spindle 24 of the valve 22 is threaded and provided with nuts 25 for adjusting the level and tension of the spring 23.

A compression spring 28 forms a biasing element tending to move the membrane 13 to the other extreme position 13a shown in broken lines. Spring 28 is clamped between a bearing surface 26, which is arranged on the membrane 13, and an abutment 27 which is arranged in the container 1 and on which the spring 23 is secured. Around its periphery, the membrane 13 is provided with a bead-shaped rib 29 in which there are two grooves. The container 1 consists of two halves 30 and 31 provided with flanges 32 and 33, respectively, which are inserted in these grooves in the rib 29, whereby the two halves 30 and 31 are kept together. In the bottom outlet 10 is a valve body 34 cooperating with an opening 35 which is arranged in the lower half 31 of the container, whereby the bottom outlet is closed when the valve body 34 is lifted towards the opening 35. The container 1 is provided with a bracket 36 for attaching it to a wall or the like.

The apparatus functions as follows. If it is assumed that the pipe 19 is in open communication with the vacuum line 8 through the cock 9, and that the membrane 13 is in the upper extreme position shown in full lines in FIG. 2, the valve 17 is kept pressed against the opening 20 and thus closes it. The pipe 18, which is directly connected with the valve 17, is at the same time kept in the position shown in FIG. 2 and thereby presses the spring 23 upwards so that the valve 22 is in its upper position, in which the opening 21 is uncovered. The sucking power on the valve 17 is so great that it is capable of keeping the valve 22 in its open position against the action of the spring 23. The chamber 14 is thus in communication with the surrounding atmosphere, and air enters it until atmospheric pressure occurs in this chamber. The membrane 13 is thereby displaced, under influence of the power exerted by the spring 28, towards the lower extreme position shown at 13a. Just before the membrane 13 attains this extreme lower position, the thread 16, which in the upper position of the membrane is situated in a recess 37, is stretched tight so that the final downward movement of the membrane draws valve 17 downward and thereby uncovers the opening 20. Since pipe 18 moves with valve 17, this final movement also releases the spring 23 so that it carries the valve 22 back to the position closing the opening 21. The chamber 14 is thus shut off from communication with the outside air and is instead brought into communication with the vacuum line 8, as through holes 38 arranged in the sleeve 18. The resulting evacuation of the chamber 14 causes the membrane 13 to rise again towards its upper extreme position, whereupon the described operation cycle is repeated. This operation continues as long as the cock 9 is in its opening position. If, however, the cock 9 should be moved to its closing position, it is evident that the membrane 13 either immediately stops in its lowest position or is returned to this position after a period of time, since the container 1 is provided with a regulation valve 39 by means of which an adjustable leakage of atmospheric air into the chamber 14 is maintained in order to provide for adjusting the pulsation frequency to a value suitable for the apparatus. Even if the membrane should be in a mean position, when the cock 9 is moved to the closing position and the opening 21 consequently is closed, the chamber 14 will nevertheless be gradually filled with atmospheric air, due to the regulation valve 39, whereby the membrane 13 is moved by the spring 28 to its lower extreme position.

It is evident that in the operation of the apparatus, the cleaning liquid, during the movement of the membrane 13 from its lower to its upper extreme position, will be drawn or lifted through the tubes 6 from the container 2 to the chamber 15 in the container 1. While this is going on, the return line 11 is kept blocked by the valve 34 which is sucked upwards toward the edge surrounding the opening 35. When the membrane 13 then reverses its direction of movement and returns to its lower position, as previously described, the liquid in the chamber 15 flows back to the container 2 but passes now through the tubes 6 as well as through the return line 11. The emptying of the chamber 15 can thus take place very rapidly, particularly because of the pressure exerted by the spring 28 upon the membrane 13.

It will be apparent that the nipples 7 form coupling means for connecting the channeled parts 5—6 to the lower chamber 15 of the closed container, whereby the above-described operation of membrane 13 causes the cleaning liquid to flow back and forth through the channels of these parts between the open container 2 and the chamber 15 of the closed container.

The apparatus described above may be modified in various respects without departing from the inventive idea. For example, the spring 28 may be replaced by a weight actuating the membrane 13. Further, the valve 22 may be arranged to admit air of superatmospheric pressure, instead of atmospheric air, into the chamber 14, whereby there is no need for the spring 28 (or a weight) to urge the diaphragm 13 downward.

I claim:

1. In an apparatus for cleaning a machine part having a throughflow channel, said apparatus including a closed container wherein a subatmospheric pressure and at least atmospheric pressure are alternately created, and an open container for containing a cleaning liquid adapted to flow back and forth through said channel between the containers under the action of said alternating pressures, the combination of a membrane dividing said closed container into first and second chambers and movable between two extreme positions, a valve device operable to connect the first of said chambers alternately to a vacuum source and a source of at least atmospheric pressure in response to movements of the membrane to first one and then the other of said extreme positions, and coupling means for connecting the second of said chambers to the open container through said channel of the machine part, whereby said membrane movements cause said liquid to flow back and forth through said channel.

2. The combination according to claim 1, in which the valve device includes two control valves and means for opening and closing one of said valves in response to closing and opening, respectively, of the other of said valves, one of said valves being operable in its open position to connect said first chamber with said source of at least atmospheric pressure, the other of said valves being operable in its open position to connect the first chamber to said vacuum source.

3. The combination according to claim 1, comprising also a biasing element acting on the membrane to urge it toward the one of said extreme positions in which said second chamber has its smallest volume.

4. The combination according to claim 1, comprising also a flexible member connecting the membrane to the valve device to operate said device.

5. The combinations according to claim 1, in which the closed container has two halves each formed with a peripheral flange, the membrane having a peripheral bead-shaped rib formed with grooves for receiving said flanges, respectively, to hold the halves together.

6. The combination according to claim 1, in which said second chamber has a bottom outlet from which said flow line leads, the combination comprising also a non-return valve in said flow line for blocking flow from the open container to the closed container through said flow line.

7. In an apparatus for cleaning a machine part having a throughflow channel, said apparatus including a closed container wherein a subatmospheric pressure and at least atmospheric pressure are alternately created, and an open container for containing a cleaning liquid adapted to flow back and forth through said channel between the containers under the action of said alternating pressures, the combination of a membrane dividing said closed container into first and second chambers and movable between two extreme positions, a suction line leading into the first of said chambers, said first chamber having an opening leading to a source of at least atmospheric pressure, a first valve operatively connected to the membrane and movable thereby to positions for closing and opening the suction line in response to movements of the membrane to its two extreme positions, respectively, a second valve controlling said opening, valve-operating means connected to the second valve for opening and closing the second valve in response to movements of the first valve to said closing and opening positions, respectively, and coupling means for connecting the second of said chambers to the open container through said channel of the machine part, whereby said membrane movements cause said liquid to flow back and forth through said channel.

References Cited in the file of this patent

UNITED STATES PATENTS

| | | |
|---|---|---|
| 2,233,852 | Schmitt | Mar. 4, 1941 |
| 2,297,653 | Horton | Sept. 29, 1942 |
| 2,934,024 | Hallstrom | Apr. 26, 1960 |

FOREIGN PATENTS

| | | |
|---|---|---|
| 889,550 | Germany | Sept. 10, 1953 |